(12) United States Patent
Svitkin et al.

(10) Patent No.: US 6,568,096 B1
(45) Date of Patent: May 27, 2003

(54) DEVICE AND METHOD FOR MEASURING SHAPE DEVIATIONS OF A CYLINDRICAL WORKPIECE AND CORRECTING STEADYING ELEMENT AND CORRECTING FOLLOWER FOR USE THEREWITH

(75) Inventors: Mark Mikhailovich Svitkin, Sankt-Petersburg (RU); Iosif Davydovich Gebel, Sankt-Petersburg (RU); Askold Ivanovich Nefedov, Sankt-Petersburg (RU); Yakov Isakovich Binder, Sankt-Petersburg (RU)

(73) Assignee: Obschestvo s Ogranichennoi Otvetctvennostju "Tekhnomash", Sankt Petersburg (RU)

( * ) Notice: Subject to any disclaimer, the term of this patent is extended or adjusted under 35 U.S.C. 154(b) by 0 days.

(21) Appl. No.: 09/889,765
(22) PCT Filed: Feb. 14, 2000
(86) PCT No.: PCT/RU00/00057
§ 371 (c)(1), (2), (4) Date: Nov. 2, 2001
(87) PCT Pub. No.: WO00/50841
PCT Pub. Date: Aug. 31, 2000

(30) Foreign Application Priority Data

Feb. 22, 1999 (RU) .......................................... 99103354
Jul. 21, 1999 (RU) .......................................... 99115540
Dec. 28, 1999 (RU) .......................................... 99127252

(51) Int. Cl.[7] ................................................. G01B 5/20
(52) U.S. Cl. .......................... 33/550; 33/501.02; 82/162
(58) Field of Search .............................. 33/501.02, 549, 33/550, 551, 553, 554; 82/117, 162; 269/55, 80, 86, 94, 126; 451/64, 158, 177, 259, 268, 269, 402

(56) References Cited

U.S. PATENT DOCUMENTS

| | | | | | |
|---|---|---|---|---|---|
| 2,660,798 | A | * | 12/1953 | Delaney | 33/550 |
| 3,650,036 | A | * | 3/1972 | Coveney et al. | 33/554 |
| 3,942,253 | A | * | 3/1976 | Gebel et al. | 33/551 |
| 4,050,293 | A | * | 9/1977 | Shimomura et al. | 33/501.02 |
| 4,546,681 | A | * | 10/1985 | Owsen | 82/162 |
| 4,823,657 | A | * | 4/1989 | Welin-Berger | 82/162 |
| 5,337,485 | A | * | 8/1994 | Chien | 33/550 |
| 5,535,143 | A | * | 7/1996 | Face | 33/552 |
| 6,272,762 | B1 | * | 8/2001 | Kinast et al. | 33/550 |
| 6,273,785 | B1 | * | 8/2001 | Mulroy et al. | 451/178 |

* cited by examiner

Primary Examiner—G. Bradley Bennett
(74) Attorney, Agent, or Firm—Abelman, Frayne & Schwab

(57) ABSTRACT

A device and method for measuring deviations in shape of a generally cylindrical workpiece is disclosed. The device enables measurement of a number of shape-defining parameters while the workpiece is positioned in a machine tool, so that the workpiece does not have to be removed from the machine tool in order for the measurements to be taken. A steadying rest, for use on machine tools to hold a workpiece, especially one having a longitudinal central axis that is rotationally unsymmetrical or unstable with respect to the machining tool, in position to enable measurement of the shape defining parameters and shape deviations while the workpiece is mounted on the machine tool, is also disclosed.

37 Claims, 8 Drawing Sheets

DEVICE AND METHOD FOR MEASURING SHAPE DEVIATIONS OF A CYLINDRICAL WORKPIECE AND CORRECTING STEADYING ELEMENT AND CORRECTING FOLLOWER FOR USE THEREWITH

FIELD OF THE INVENTION

This invention relates generally to the field of measurement engineering and to the machine-working of workpieces to produce cylindrically-shaped workpieces; more particularly to the measurement of deviations of shape or form of nominally cylindrical, including conical and barrel-shaped, workpieces; and still more particularly to the machine-working or cutting of cylindrically-shaped workpieces from blanks having a longitudinal central axis that is unsymmetrical and/or positionally unstable with respect to a machining or cutting tool.

BACKGROUND OF THE INVENTION

Precision cylindrical workpieces, such as shafts and axles, are extensively used in present-day machines and mechanisms. Very often, deviations from roundness of these cylindrical parts greatly affects the effectiveness and efficiency of the machines incorporating such workpieces. For example, deviations from from roundness of journals causes vibration, noise, heating and other adverse phenomena in ball and roller bearings, and so greatly shortens their useful life. Roundness is equally important for such elements, as crankshaft necks, piston pins, electric motor commutators, etc.

STATE OF THE ART

Existing methods and devices are only capable of overcoming the problem caused by deviations from roundness in machined workpieces, and are capable of testing for such deviations in relatively small workpieces (generally, those that are up to 400 mm in diameter and up to 500 mm in length), while the workpiece is out of a machine tool that is used to cut or otherwise shape the workpiece into a cylindrically-shaped object; and only while the workpiece or object being measured is stationary, using a stationary roundness tester.

One known device for measuring the roundness of a workpiece while it is out of the cutting tool or other machine used to impart the rounded shape into a blank is disclosed in Russian Patent No. SU 1,623,573, which issued Feb. 24, 1987. The device disclosed there includes a frame mounted on four damped bearings for vibration elimination. A mount, having a turntable for a workpiece to be measured, is attached to a frame on which there are secondary shock dampers. A sensor with a fixing pen, or measuring stylus, which tracks and interacts with a surface of the workpiece, is fitted on a motor-driven sliding member. The pen or stylus is utilized for measuring various parameters relating to the deviation of certain dimensions of the workpiece, and the surface structure of the workpiece, from ideal roundness and straightness, as applicable. The pen or stylus tip is capable of movement in any direction within a rectangular-shaped work area.

The device of this reference, however, has a number of drawbacks, specifically:
—it is technically complex, and is not completely protected against vibration, which affects the accuracy of its measurements; and
—the device is not suitable for use in measuring large workpieces, such as calenders or forming rolls, in which deviations from roundness may have an effect on the quality of paper, foil, rolled products, etc. produced on machines incorporating such workpieces.

A device and method for measuring deviations from roundness of an object is also disclosed in U.S. Pat. No. 3,942,253, which issued May 3, 1974. The device of that reference includes a linear displacement-sensing element, radial locating support members, which are made as multi-stepped, self-adapting rocking levers that are symmetrically positioned with respect to the linear displacement-sensing element. When a workpiece rotates without axial movement, a measuring gauge of the device measures the deviation from roundness of the workpiece's cross-sectional profile.

This device of this reference also has a major limitation in that it can measure only one parameter of a cylindrical piece, namely the deviation from roundness. Measurement of only the deviation does not, however, give a full indication of the workpiece's shape, and so does not enable a complete determination of the precision of machining of a cylindrical workpiece, since other shape-related parameters along the axial length of the workpiece cannot be properly measured.

Precision machining of long cylindrical workpieces creates a number of problems because of the presence of steadying elements or rests positioned along the length of the workpiece or object, which are used for holding the workpiece steady and in place on a machining tool used to cut a cylindrically-shaped object from a workpiece blank . The presence of such steadying rests prevents precise positioning of the longitudinal axis of rotation of the workpiece with respect to the cutting tool. In fact, the presence of such steadying rests often leads to a transfer of deviations from roundness from a reference object to the machined object.

A steadying rest of the type mentioned above, is disclosed in Russian Patent No.

SU N2 1,660,929, which issued May 3, 1989. The steadying rest of that reference includes a body having a piston with a piston rod linked through a moving chain with an inverted V-type and a presser jaws. The moving chain is made as a rigid bar with stop members and an additional rod aligned with the main rod and designed to interact with the presser jaw through introduced spring-loaded rod. The apparatus functions as follows: the prismatic jaw is driven to the reference piece and positioned to grasp tightly the neck, then fixed so. After adjustment, the piece is placed in the machine tool and the piston is moved to press the inverted V-type jaw to the piece.

Simultaneously the secondary rod moves the piston, which presses the presser jaw to the piece by rotating it. After completion of machining, the piston is moved to the right, the presser and the prismatic jaws are taken off the piece.

The device of this reference has a number of shortcomings, which cause deviations of form to be transferred from the reference surface to the workpiece being machined. In addition, the steadying rest of this reference does not allow for the machining of large, heavy pieces, thereby severely limiting its use.

Another steadying rest, with self-adjusting supports, is disclosed in the journal *Stanki i instrument*, 1976, No. 7, at p. 22–23. In the body of the steadying rest disclosed there, there are two self-adjusting inverted V-blocks movable in a radial direction. The workpiece is pressed to them with its external (datum) surface through a spring-loaded stop. Additionally, there is a secondary support that is a pad made from a fluoroplastic material in the steadying rest's body, which functions to partially counterbalance the weight of the workpiece.

A limitation of this device is the spring-loaded horizontal stop, which presses the workpiece against self-adjusting bearings. If the machining datum surface has deviations from roundness, then this stop follows these deviations when the workpiece rotates, the stop must move for distances equal to datum surface's deviations from roundness. A still further limitation of this device is that it also does not allow for machining of large, heavy workpieces, thereby severely limiting its use.

Still another device for the machining of surfaces of revolution onto a workpiece having a longitudinal central axis that is unsymmetrical and/or unstable with respect to the machining tool during the machining is disclosed in Russian Patent No. RU N2 2,111,089, which issued Feb. 20, 1996.

Corrections to the workpiece shape are made by placing the cutting tool within the angle of supporting element shoes. The shoes and the tool are mounted on a single bracket, which is capable of rocking movement in a plane perpendicular to the workpiece's axis of rotation.

The device of this reference has a limitation in that the force of pressing the shoes and the tool against the workpiece surface depends on the elastic strain of a spring, which is not constant. This circumstance has a negative effect on the machining accuracy. Furthermore, the device does not allow for a run-out greater than 10 mm, as the bracket with the shoes cannot track such large displacements of the workpiece, and the device will not work in such situations.

The foregoing analysis of the prior art is supported by the results obtained from existing devices. These results are known to the person skilled in the art of precision shaft machining and support the conclusion that prior to the apparatus and method of the present invention, there has been no highly effective device or method, which allows for:

— precision measurement in detail of separate geometrical parameters of the surfaces of various generally cylindrical shapes, such parameters including: longitudinal cross section profile (taper, barreling, etc.); deviations from straightness or linearity of a central longitudinal axis of a workpiece; run-out of the surface of a workpiece with respect to a of reference surface, such as in bearing journals, where such deviations need to be measured in order to obtain precision machining of cylindrical workpieces; and — precision machining of cylindrical workpieces having a longitudinal central axis of rotation that is unsymmetrical and/or unstable with respect to the machining tool; both of which are achieved by the apparatus and method of the present invention.

SUMMARY OF THE INVENTION

Accordingly, some of the limitations of the prior art that are overcome by the apparatus of the present invention, and some of the advantages of the apparatus of the present invention over the prior art, are:

— the apparatus of the present invention provides more universal device and method than was previously known by enabling a wider range of measured deviations of form of cylindrical pieces;

— more accurate measurement of deviations of form of cylindrical workpieces and more precise machining of cylindrical workpieces having a longitudinal central axis of rotation that is unsymmetrical and/or unstable with respect to a cutting or other machining tool is possible with the apparatus and method of the present invention;

— measurement of deviations of form of, and the machining of large, heavy cylindrical pieces is made possible through the apparatus and method of the present invention.

The problems and limitations of the prior art are overcome by the apparatus and method of the present invention in the following ways:

— the apparatus of the present invention provides relative stabilization of the position of the axis of a rotating workpiece by use of multi-stepped, self-adjusting inverted V-type supports;

— the apparatus and method of the present invention allow measurement of the following deviations of form of a workpiece:

— deviation in the roundness of a cross sectional profile of the workpiece—$\Delta 1$, — deviations in the shape of the longitudinal section of the workpiece—$\Delta 2$, — deviations in the straightness of a central axis through the workpiece—$\Delta 3$, and — deviations in the radial run-out from the center of a cross sectional profile of the workpiece (where the center is the center of an average, "least squares" circle)—$\Delta 4$.

According to the method of the present invention, deviations in the roundness of a cross section is measured using a first measuring sensor of a gauge, with a measuring tip which contacts the surface of the workpiece.

A second measuring sensor, which is fitted on an arm of a mount of the apparatus, and which also has a measuring tip that contacts the workpiece, is used to measure deviation in the radial run-out of the profile from the center of an average, "least squares" fitted circle, while the workpiece is being rotated. The first sensor measures the deviations from roundness of the piece cross sectional profile, and the second sensor measures radial run-out of the center of the profile, based on the center of an average, "least squares" circle. In cases where there is axial feeding of the gauge mount along the axis of the rotating workpiece, the first sensor measures the deviation from roundness of different cross sections and deviation of the average radius along the workpiece, and the second sensor measures the radial run-out of the corresponding cross section profile centers (centers of average circles). The actual workpiece central longitudinal axis is a line connecting the centers of adjacent ones of its cross sectional profiles. These measurements enable a determination to be made as to the workpiece's cross sectional profile shape, its longitudinal section profile, and the straightness of its central, longitudinal central axis.

For measurement of deviaton from roundness and axial misalignment of the workpiece profile with respect to a datum profile, a bracket is fitted in the gauge body with a third measuring sensor, also having a tip which contacts the surface to be measured.

The device for measuring shape deviations of a workpiece having at least certain cylindrical properties, according to the present invention, includes a rider-type roundness tester with multi-stepped self-adapting support elements and a first measuring sensor fitted on the body. The device is suspended on a vertical mount, which is capable of axial movement along the workpiece. A measuring unit is fitted on the above mount, the measuring unit consisting of an arm with the second measuring sensor on the one end. The other end of the arm is fixed to the vertical mount, such that the second sensor's tip contacts the roundness tester body.

In an alternative embodiment, the first sensor functions in the same manner as the second sensor in the previous embodiment. In this alternative embodiment, the measuring unit is replaced with an arm having one end fixed to the vertical mount and having a flat area on the other end. The first sensor's tip contacts the flat area of the arm.

In order to measure deviations from roundness and axial misalignment of a workpiece profile with respect to a reference, a third measuring sensor on a bracket is added to the device. The bracket is fitted on the roundness tester body, a tip of the third sensor contacts with the surface of the workpiece being measured.

One advantage of the apparatus of the present invention is the ability to perform workpiece form measurements without taking the piece off the grinding or turning machine. Workpiece machining is performed on the same machine using specially designed follower and correcting steadying rests that are based on multi-stepped, self-adapting support elements.

A correcting steadying rest includes a body having main, multi-stepped, self-adapting, inverted V-type support elements and at least one secondary support for weight compensation. The steadying rest has a sliding member and a rocking yoke that is capable of vertical movement and rotation. The main support elements are hinged to the ends of the yoke. The secondary support is a similar inverted V-block on the sliding member. The sliding member is positioned at an angle to the vertical and is capable of linear movement within the steadying rest's body. The main support elements of the steadying are fitted on the rocking yoke so that the angle between radii passing through the workpiece's center of rotation and the axes of the main support elements is from about 50 to about 130 degrees. Each of the main support elements is so positioned that the angle between the radii passing through the piece's center of rotation, the center of the main support elements, and the point of contact of an inverted V-block with the workpiece is from about 10 to about 40 degrees. The sliding member is positioned at an angle of from about 5 to about 20 degrees between the vertical and a line passing through the center of rotation of the workpiece and the axis of the secondary supports. The rocking yoke lever has arms of equal length that are capable of movement along the body of the workpiece.

A correcting follower rest includes a body with multi-stepped, self-adapting, inverted V-type support elements and a cutting tool capable of rocking in the plane perpendicular to the piece's axis of rotation.

The body of the correcting follower is made in the shape of a yoke and is fitted on a lever that in turn is capable of turning on a mount that is fixed to the machine support. The cutting tool is capable of displacement along the body within an angle of from about 0 to about 180 degrees with respect to the axis of symmetry of support elements. The body is mount on a lever and is capable of displacement within the angle 60 degrees in respect of the vertical. The support elements and the cutting tool are positioned in parallel planes perpendicular to the axis of rotation of the workpiece. The inverted V-type support elements may be single—or multi-stepped. Each support element includes a rocking lever having an opposed pair of end, with shoes hinged to each end.

Typically, the tool for cutting the workpiece from a blank is a lathe cutter or a grinding wheel.

The above-described structures of devices according to the present invention are based on stabilizing the position of an object (for example, a measuring sensor or cutting tool) with respect to the main longitudinal central axis of a rotating workpiece by use of multi-stepped, self-adapting, inverted V-type support elements. The angles between the support elements and the workpiece are determined by a specially developed mathematical expression. Devices built in accordance with this expression have many points of contact with the rotating workpiece and many degrees of freedom. The result is high-precision position stabilization of a measuring sensor or a cutting tool with respect to the workpiece axis, irrespective of any deviations from roundness in the shape of the workpiece's surface.

DETAILED DESCRIPTION OF PREFERRED EMBODIMENTS OF THE INVENTION

As a rule, when controlling the shape of a nominally round cylindrical workpiece (hereinafter "workpiece"), a person of skill in the art needs to know not only the value the deviation from cylindricity $\Delta$, but also more detailed, very specific geometrical parameters, such as lateral deviations from roundness in cross section; shape in a longitudinal direction (conicity, barrel, etc.), deviation from straightness of the workpiece's main central longitudinal axis; run-out of the surface of the workpiece with respect to a reference surface, such as, for example, a bearing journal.

Figure 3A:
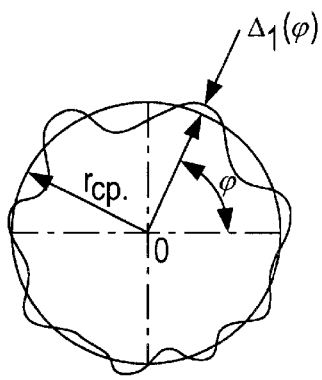
FIGS. 3 a–h show the deviations of a workpiece's geometrical shape $\Delta 1$, $\Delta 2$, $\Delta 3$, and $\Delta 4$, as calculated according to the present invention.

The following is a detailed description of the nature of deviations in shape of a geometrical form workpiece that are measurable with the device and method of the present invention:

1. Deviation from roundness in cross section of the workpiece, $\Delta 1$ $\Delta 1$ is the distance from a point on the outer edge of an average ("least squares") circle cross sectional profile of the workpiece, measured at a particular point along its main central longitudinal axis, to an actual point on the outer peripheral edge of the workpiece at that point (See FIG. 3a). Measured deviation $\Delta 1 = \Delta 1(\phi)$, where $\phi[0; 2^{90}]$, allows a determination of the profile shape and the value of the deviation from roundness, when the average ("least squares") circle drawn through a cross section of the workpiece is taken as a reference.

2. Form (shape) of a cross-section of the workpiece along its main central longitudinal axis, $\Delta 2$.

$\Delta 2$ is a measure of the deviation of the radii $R_{av}$($R_{av1}$, $R_{av2}$) of average circles at cross sectional profiles along the main, central longitudinal axis of the workpiece. Generally it is a measure of the workpiece longitudinal (axial) section shape, when generatrix lines are not parallel and the diameters of average circumferences $D_{av}$ along the central longitudinal axis of the workpiece are not equal.

Figure 3B:
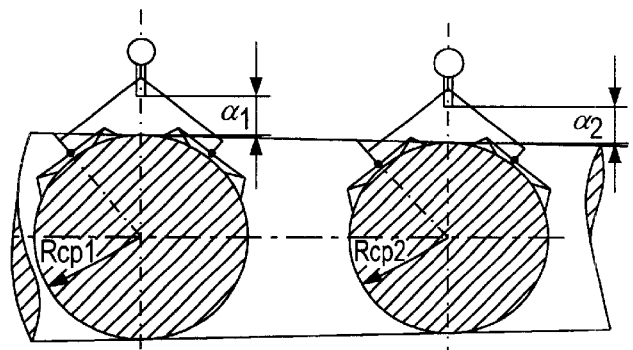
Figure 3C:
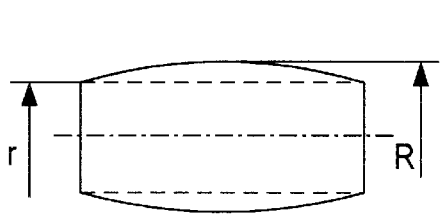
Figure 3E:
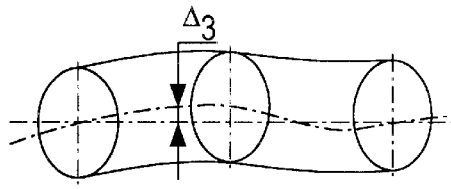
Figure 3D:
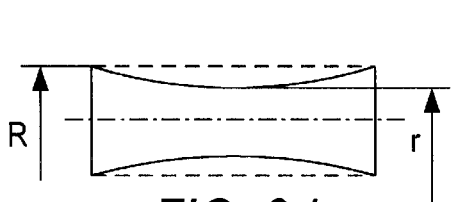
Figure 3F:
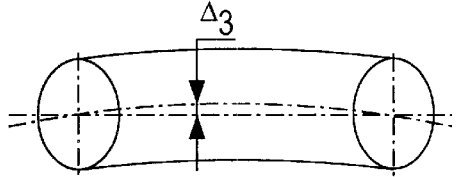
Figure 3H:
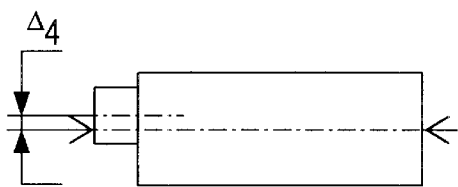

$\Delta 2 \equiv \Delta r_{av} = \max R_{av} - \min R_{av}$, the value detected by the sensor being a function of $f(R_{av})$ (See FIG. 3b).

When $\Delta 2 \neq 0$, the workpiece shape may be conical, saddle-shaped, barrel-shaped, etc. along its main, central longitudinal axis (See FIGS. 3 b, c, d).

3. Deviation from straightness of the main, central longitudinal axis of the workpiece, $\Delta 3$.

The locus of centers of average circles of a workpiece's cross sectional profiles along its length (i.e., the longitudinal direction of the workpiece) constitute a central longitudinal axis of the workpiece (the centers $D_{av.}$ are a very close approximation of the centers of gravity of the longitudinal profile of the workpiece).

For determination of the distortion or deviation from straightness of the main, central longitudinal axis through the locus of centers of circular cross-sectional profiles along the length of the workpiece, $\Delta 3 = \Delta 3(\phi)$ is measured in normal sections along the length of the workpiece (See FIGS. 3 e, f). $\Delta 3$ is measurable even when the value of the deviation from roundness is commensurate in magnitude with $\Delta 3$ (i.e., $\Delta 1 \approx \Delta 3$).

4. Deviation in the radial run-out from the centers of average circles of the workpiece, $\Delta 4$. This deviation is caused not only by distortion (deviation from straightness) of the central longitudinal axis of the workpiece ($\Delta 3 \neq 0$), but also by instability of the position of the axis of rotation $\Delta 4$ (when $\Delta 3 = 0$, $\Delta 4$ may be $\neq 0$) (See FIG. 3h).

Radial run-out deviation results from the workpiece being fixed, either in a chuck, between centers, or in steadying rests of the machine tool. Generally, an axis of rotation of a workpiece may not coincide with its geometric axis, or causes its position to change. $\Delta 4$ is measurable by the advanced method according to the present invention, even when $\Delta 1$ and $\Delta 3$ are commensurate in magnitude with $\Delta 4$.

Figure 3G:
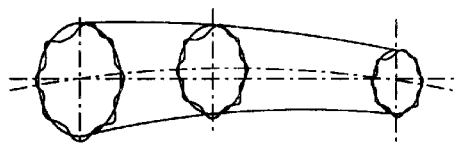

When three of the geometrical parameters $\Delta 1$, $\Delta 2$, and $\Delta 3$ are known, a three-dimensional (3D) representation of the actual workpiece shape can be plotted (See FIG. 3g). The deviation from cylindricity of the workpiece can then also be calculated.

Figure 1:
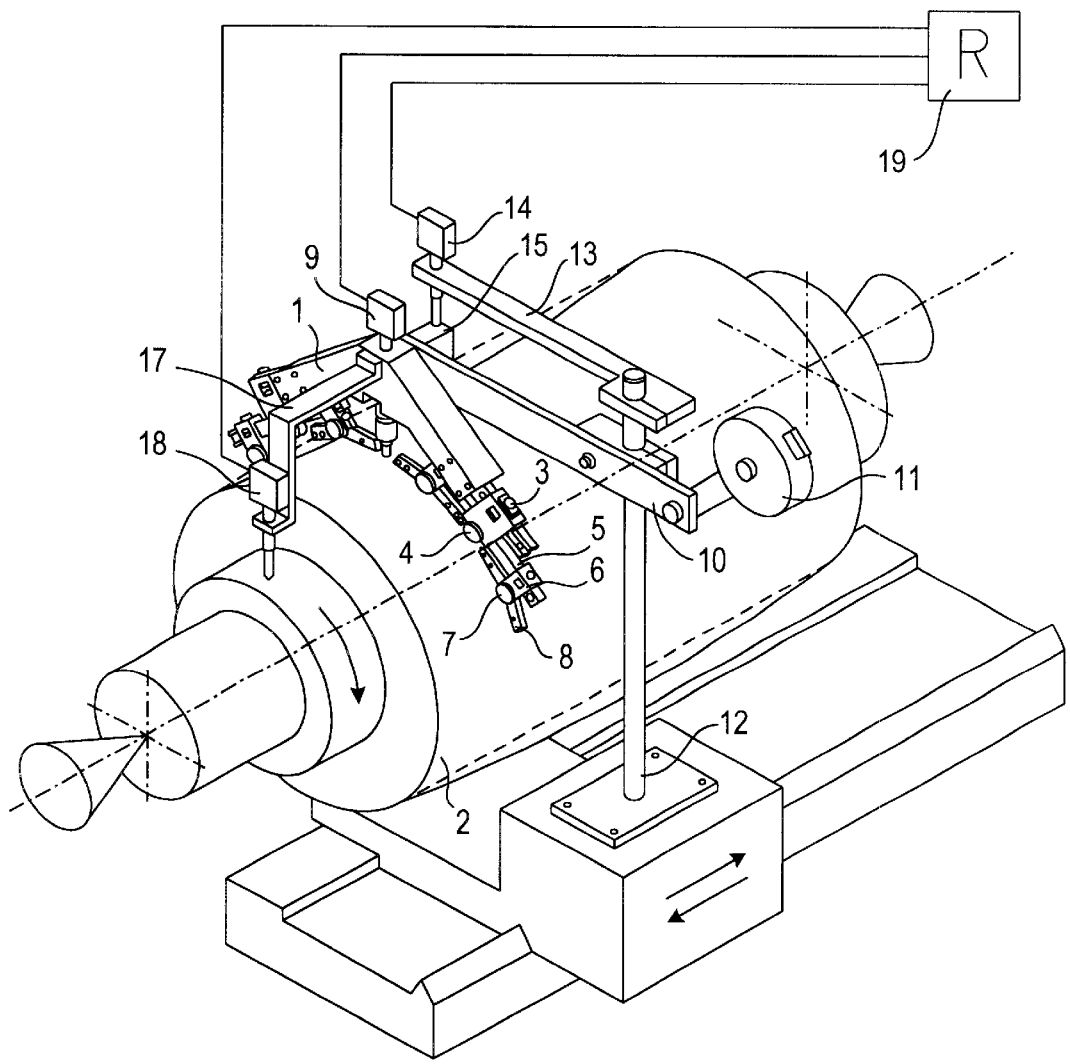
FIG. 1 is a general view of a device of the present invention, for measuring shape and form deviations of a cylindrical workpiece.
Figure 2:
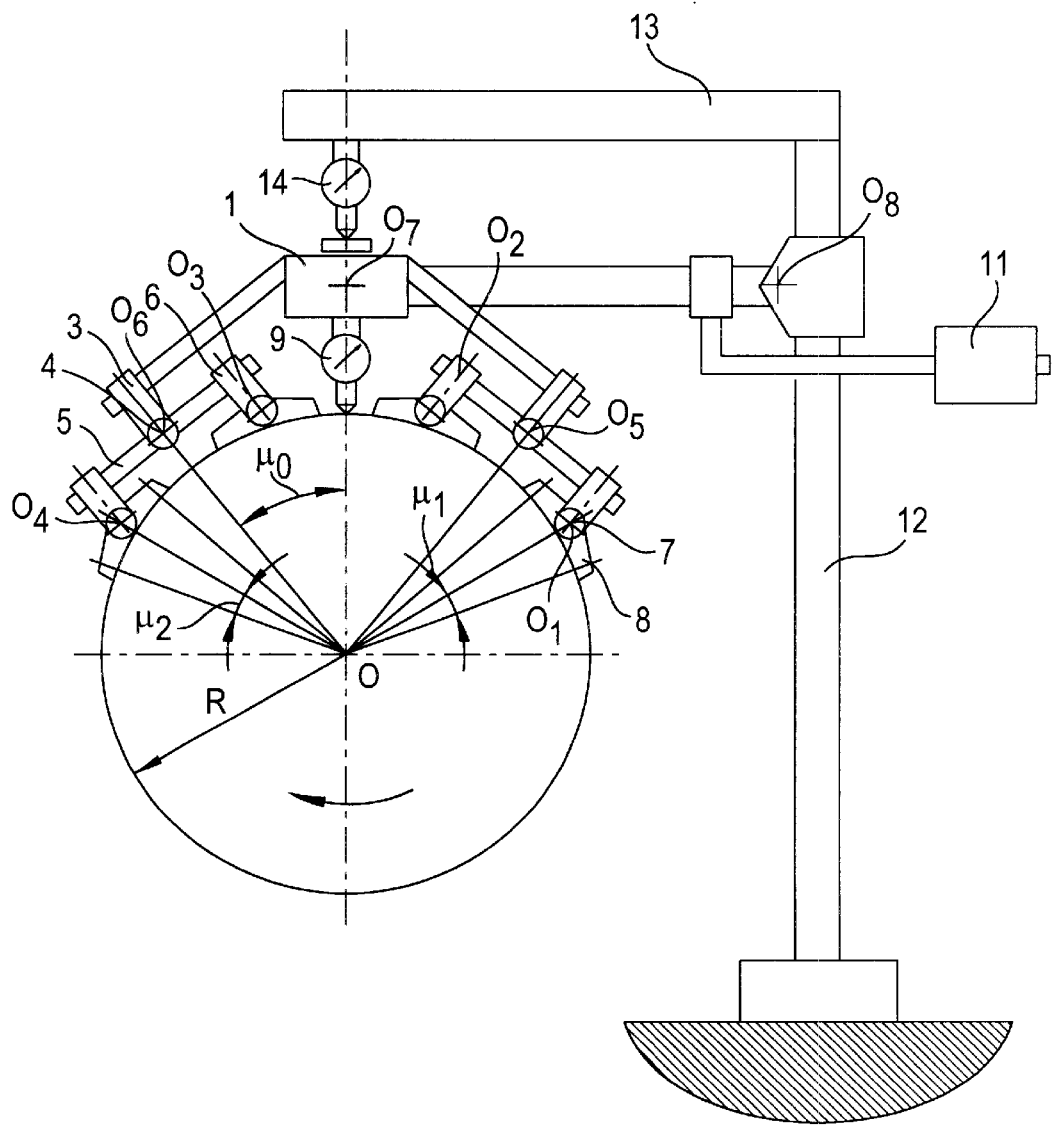
FIG. 2 is a detailed view of the positions of levers and hinges on the device of FIG. 1.
Figure 4:
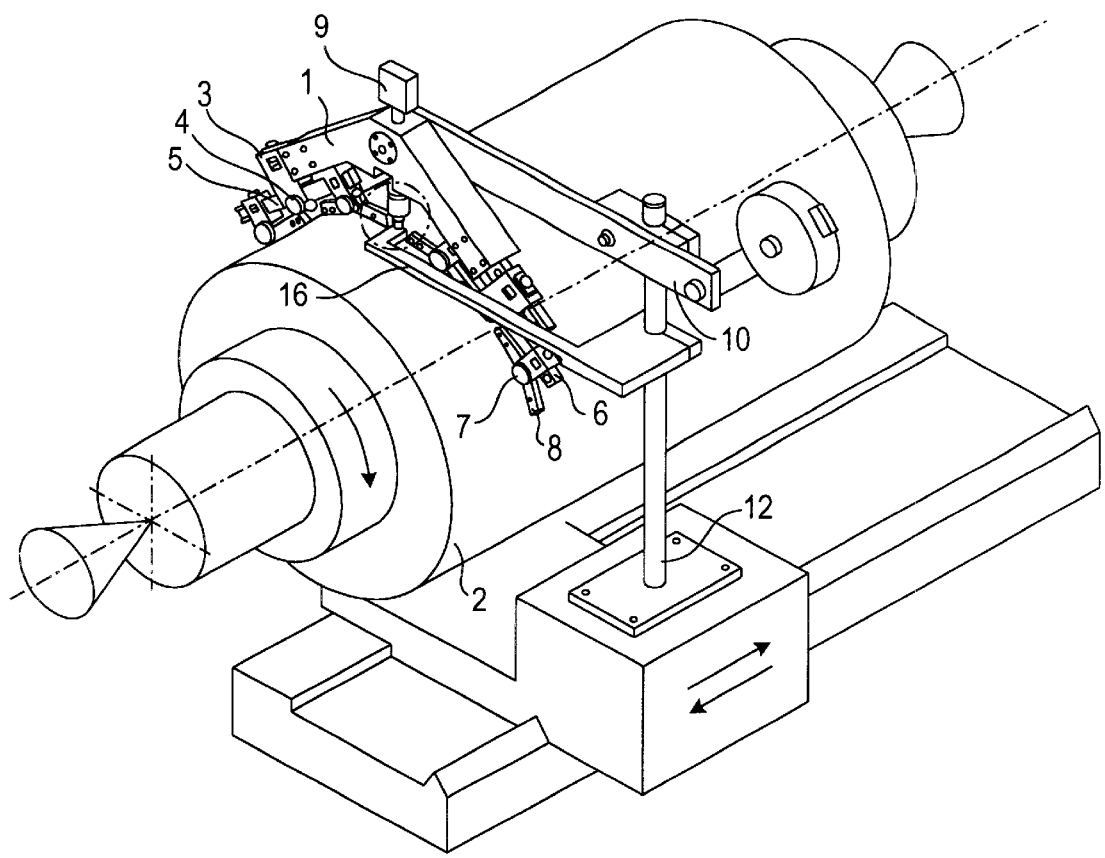
FIG. 4 shows a general overall view of one embodiment of a device for measuring shape and form deviations of a cylindrical piece, according to the present invention.

The device of the present invention represented in FIG. 1 includes a rider-type roundness tester having an equal-arm body 1, with self-adapting support elements. The support elements are a multi-stepped levers-and-hinges system of inverted V-shaped blocks, with axes of rocking thereof being positioned at certain angles with respect to the center of rotation of the workpiece. Each stepped element of the device includes sliding members and a rocking lever. FIGS. 1, 2, and 4 show a two-stepped roundness tester design.

The device is placed on the workpiece 2. On the ends of the device body 1 there are slideways for first-step slide members 3. In the lower part of each first-step sliding member there is an axle 4 with first-step rocking lever 5.

Second-step sliding members 6 are positioned on the ends of first-step levers 5, and are capable of moving along the levers. In the lower part of each second-step sliding member there are axles 7 with second-step rocking levers 8, with inverted V-shaped shoes on them. The material of the shoes, in contact with the surface of the workpiece, is selected depending on the material and quality of the workpiece surface itself, so as to avoid sticking. The material of the shoes is typically tungsten carbide, a fluoroplastic, or some other similar non-sticking material.

A first, main measuring sensor 9, for measuring the deviation from roundness of a cross sectional profile of the workpiece, $\Delta 1$, is positioned at the center of the device body 1. The sensor is supported on a rod, and has a measuring tip, which contacts with the surface of the workpiece being measured.

The device body 1 is hinged at one end to one end of a lever 10, which has a counterweight attached to an opposite end, to compensate for the weight of the device itself, and provide a force needed to press the device shoes to the surface of the workpiece. The lever 10 is hinged to a vertical mount 12, which can be mounted on the body of the machine tool, a tool post, or a grinding head, and is capable of tracking movement along the surface of the workpiece.

Mount 12 also contains a measuring unit, which includes an arm 13 that is fixed to the mount 12, with a second measuring sensor 14 at the end. A tip of sensor 14 contacts a horizontal area 15 of the device body 1.

Figure 5:
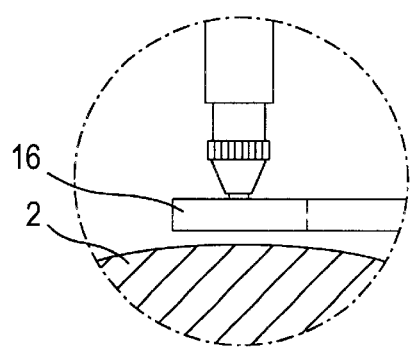
FIG. 5 shows an enlarged view of a measuring tip and arm of the apparatus of FIG. 4.

FIGS. 4 and 5 show an alternative embodiment of the apparatus of the present invention, in which the first sensor 9 functions as the second sensor 14 of the previous, above-described embodiment. In this alternative embodiment, the measuring unit with sensor 14 is replaced with an arm 16, having one end fixed to a vertical portion of mount 12 and with the other end bearing a flat area, to which the tip of sensor 9 is in contact. The arm 16 is attached to the mount 12, and, when necessary, is capable of being turned off. FIG. 5 shows an enlarged view of the flat area and measuring sensor tip 14.

Referring again to FIG. 1, bracket 17, bearing a third measuring sensor 18, is located on the roundness tester body 1. When necessary, the bracket can be pointed off to deactuate the third measuring sensor 18. As the workpiece rotates, the sensor 18 measures the deviation from roundness and deviation from coaxiality of its profile with respect to the reference.

Signals from the three sensors 9, 14, 18 go to signal processing unit 19. Signals from a workpiece swivel angle sensor and from a longitudinal feed sensor (both not shown) can also be sent to signal processing unit 19.

The measurement process takes place as follows:

The device body 1 is positioned on the rotating workpiece 2 surface and it is pressed to the surface of the workpiece with the self-adapting shoes by gravity action.

Next, the first measuring sensor 9 is tuned.

The multi-stepped support elements are free to turn about the axes $O_1$–$O_8$ (FIG. 2), which allows the shoes 8 to securely contact the workpiece surface. The device's levers-and-hinges system, with eight degrees of freedom in the plane of the profile under measure, ensures steady tracking of the workpiece surface by the sensor 9. Any fluctuation of the trajectory of point O (the center of a "least squares" average circle of the measured shaft profile) does not affect indications of the sensor 9, which monitors the deviation from roundness of the rotating shaft's cross sectional profile.

Contact between the device shoes and the surface of the workpiece being measured is determined by fixed angles $\mu_0$, $\mu_1$, $\mu_2$ (See FIG. 2), where:

$\mu_0$ is the angle between the vertical and the radius passing through the axis of rocking of the first-step rocking lever (point $O_5$ or $O_6$) and the center of rotation of the piece (point O);

$\mu_1$ is the angle between a radius passing through the center of rotation of the workpiece, the shoe's axis of rocking (points $O_1$, $O_2$, $O_3$, $O_4$), and the axis of rocking of the first-step rocking lever (points $O_5$, $O_6$);

$\mu_2$ is the angle between a radius passing through the center of rotation of the workpiece, the axis of rocking of the shoe (points $O_4$, $O_5$), and the point of contact of one shoe's contacting surface with the workpiece.

When the workpiece is rotated without longitudinal feed, sensor 9 measures the deviation from roundness of a cross sectional profile of the workpiece, taken at a particular point along the length of the workpiece, while sensor 14 measures the deviation in the run-out of the radius at a point from the center of an average circle, for the same cross-sectional profile.

When there is longitudinal feed or movement of the workpiece, the device moves along the rotating workpiece and the sensor measuring tip describes a circular helix on the surface of the workpiece, having a pitch being equal to one revolution around a circular profile of the workpiece.

In the case where there is longitudinal feed of the workpiece, sensors 9 and 14, in addition to measuring the deviation from roundness and the deviation in the radial run-out, also measure the deviation of diameters of average circles measured at points along the main central longitudinal axis of the workpiece, as a measure of the shape (conicity, barrel shape, etc.) of the workpiece.

The relationship between the deviations measured by sensors 9 and 14 and the measured deviations of the diameters of average circles along the main central longitudinal axis of the workpiece is given by the following expression:

$$\Delta 9 = (1-\lambda)\Delta_r,$$

where $\Delta 9$ is the sensor 9 measurement taken as the sensor moves along the length of the workpiece, and wherein the radii of average circles of different cross sections at different points along the length of the workpiece differ by $\Delta r$;

$\lambda$ is a proportionality coefficient;

$$\lambda = (\cos\mu_0 \cdot \cos\mu_1 \cdot \cos\mu_2)^{-1}$$

$$\Delta 14 = \lambda \Delta_r,$$

where $\Delta 14$ is the sensor 14 measured deviation when moving along the workpiece, wherein the radii of average circles of different cross sections differ by $\Delta r$.

For example, when $\mu_0 = 39°$, $\mu_1 = 20°$, $\mu_2 = 10°$, $\lambda$ is approximately 1.39, so $\Delta 9 = -0.39\Delta r$ and $\Delta 14 = 1.39\Delta r$.

Sensor 18 measures the deviation from roundness and any deviation of the profile being measured with respect to a reference profile. Knowing the changes in the indications of sensors 9 or 14 when moving along the piece and the changes in the indications of sensor 18, one can determine the workpiece diameter change controlled by the sensor 18.

In addition to enabling measurement of the deviation from roundness of the outer or external surface of a workpiece, the device of the present invention also enables measurement of any deviation from roundness and deviation in radial run-out of an internal surface of a workpiece. In order to measure internal surface deviations, a minor modification in the design of lever 17 is required.

The workpiece shape is measurable directly while the workpiece is on the grinding or turning machine, with subsequent machining of the workpiece being enabled, through the use of correcting steadying and follower rests. The correcting rests are based on the use of multi-stepped, self-adapting support elements.

Figure 6:
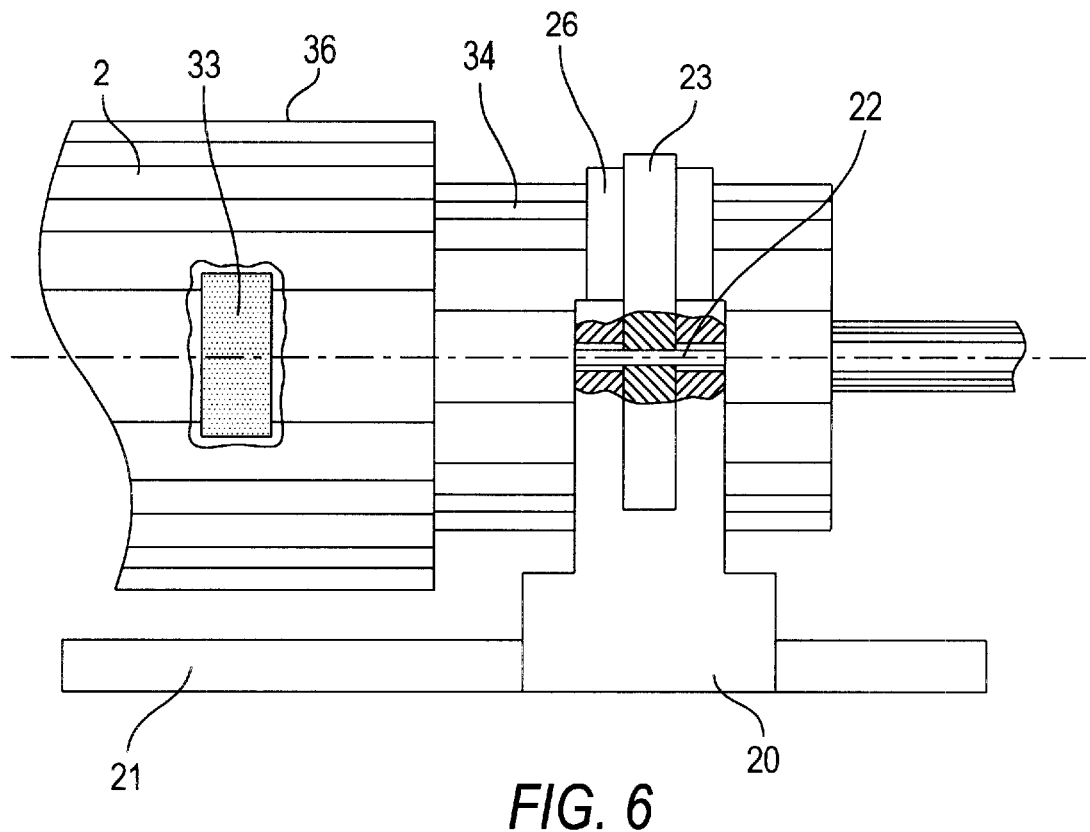
FIG. 6 shows a front view of a correcting steadying rest of the present invention.
Figure 7:
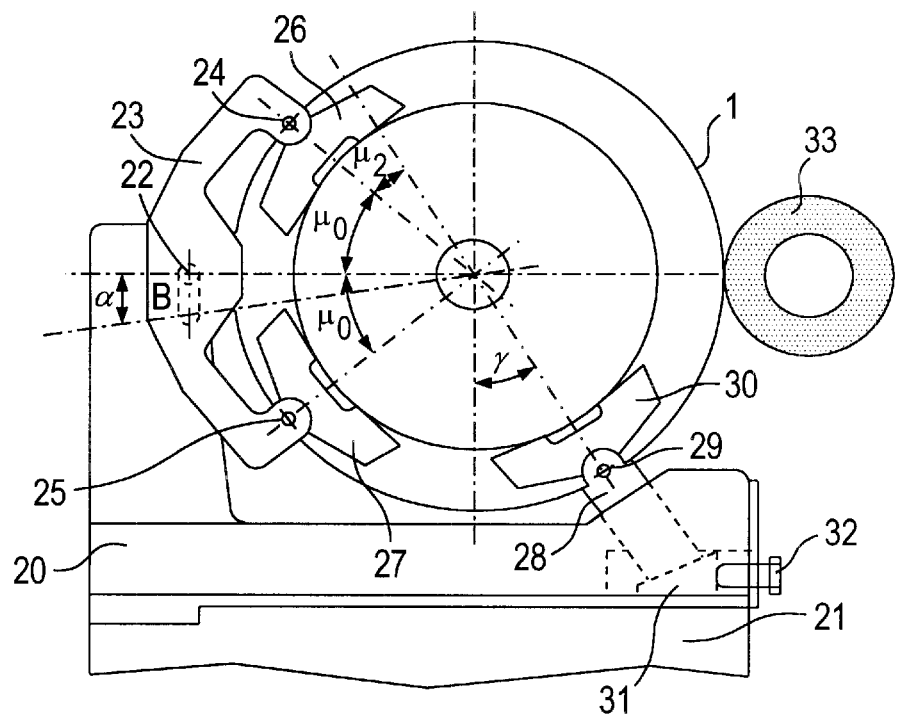
FIG. 7 shows a side view of the steadying rest of FIG. 6.
Figure 8:
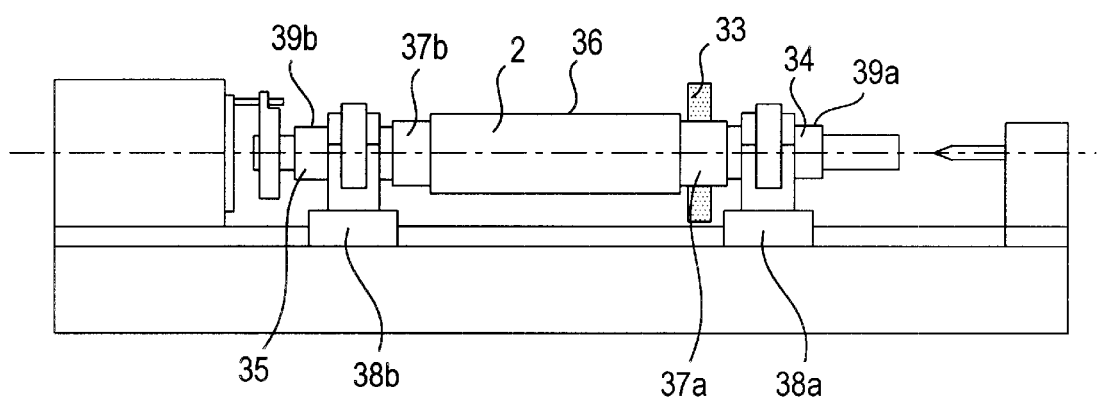
FIG. 8 shows a general view of a workpiece positioned in steadying rests of FIG. 6.

FIGS. 6 and 7 illustrate the design of a correcting steadying rest. FIG. 8 shows a general view of a workpiece placed in a number of correcting steadying rests. The workpiece, for example, a calender roll, is set on the machine in the correcting steadying rests. A steadying rest is designed as follows:

Correcting steadying rest axle 22 is mounted on the body of the correcting steadying rest 20, which, in turn, is mounted on the machine body 21. Correcting steadying rest axle 22 bears a rocking yoke 23, which is capable of rotation.

Additionally, correcting steadying rest axle 22 is set in a vertical slot B on the body of the correcting steadying rest 20 so that the rocking yoke can move within the angle $\alpha$ between the line passing through the centers of rotation of the workpiece and rocking yoke, and the horizontal plane.

Shoe axles 24 and 25 are fitted on the ends of the rocking yoke 23, with the main self-adapting support elements (shoes) 26 and 27 being mounted thereon. The shoes are made as inverted V-shaped blocks, having surfaces in contact with the journal 34 of the workpiece 2 as it is being machined. The arms of the rocking yoke 23, having the main shoes 26 and 27 thereon, may also be made so as to be movable with respect to the rocking yoke body (not shown in FIG. 8).

Shoes 26 and 27 are positioned at an angle $2\mu_0$ between them. The angle is formed by the radii passing through the center of rotation of the workpiece 2 and the centers of axles 24 and 25 of the main shoes and has a magnitude of from about 50 to about 130 degrees. The angle $\mu_2$ is from about 10 to about 40 degrees and is formed by the radius passing through center of rotation of the workpiece 2 and the center of the main axle 24 of the shoes, and the radius passing through the center of rotation of the workpiece and one of the points of contact of the main shoes with the workpiece. A sliding member 28 is mounted on the body of the steadying rest. A secondary-supporting element 30, which compensates for the weight of the work piece and which presses the workpiece to the main shoes, is pivotally attached to sliding member 28 by axle 29. Sliding member 28 is set at an angle $\gamma$, of from about 5 to about 20 degrees, formed by the radius passing through the centers of rotation of the workpiece and the secondary supporting element 30, and the vertical axis. The position of the sliding member ensures stable pressing of the main shoes to the workpiece. The position of the sliding member 28 can be adjusted within the body of the device 20 by use of a wedge 31 and thumbscrew 32.

A surface of revolution is machined onto a workpiece blank as follows:

The workpiece 2 is set on a lathe or cylindrical grinding machine having a headstock, carriage with tool post (or grinding head) 33, tailstock, and correcting steady rests on the machine body.

The workpiece 2 is linked to a headstock chuck through a driving element. The journals 34 and 35 of the workpiece 2 are supported by the steadying rests 38a,b.

When the surface of revolution 36 of the workpiece 2 is machined, the self-adapting support elements 26 and 27 stabilize the rotational axis of the workpiece and roundness can usually be imparted to the workpiece blank in a single cutting operation (without resetting of the steadying rests).

If the desired round shape cannot be imparted to the workpiece blank in a single cutting operation, such as in the case of a complex cylindrical shape, a multi-stage, cascade cutting approach is used.

Such a multi-stage cutting process is performed as follows:

After setting the workpiece's journals 34, 35 in the steadying rests 38a,b, the workpiece is rotated, and the first cutting step is performed by the cutting tool 33, which results in a narrower circular surface 37a.

The roundness of the workpiece surface is improved due to the stabilizing effect of the self-adapting support elements 26 and 27 on the workpiece rotational axis.

A second machining (cutting) step is then performed as follows:

The steadying rest 38a is repositioned to under the new surface 37a, and the cutting tool 33 is moved into proximity of the surface 39a of the journal 34, and another machining (cutting) step is performed, resulting in a still more accurately rounded workpiece product. Additional cutting steps may be performed as needed to achieve the desired shape, by repeating the above procedure.

In a similar way, the secondary processing surface 37b at the other end of the workpiece 2 is produced by sequentially machining the surface 39b of journal 35, the journal 35 being positioned on the steadying rest 38b. The steadying rest 39b is then repositioned to under the surface 37b and machining of the journal 35 is performed. Finally, machining of the main surface 36 of the workpiece is performed.

In cases where the workpiece being machined is large and heavy, it is, however, not convenient to reposition the steadying rests. In such a case it is preferred that the cutting tool be moved into proximity to the surface of the workpiece with which the steadying rest is in contact, and to machine a strip on the surface. This situation requires careful setting of the steadying rests at the correct angles, which are determined by the conditions needed to obtain the desired degree of roundness (see FIG. 7).

For certain types of workpieces, it is more convenient to use a correcting follower rest.

Figure 9:
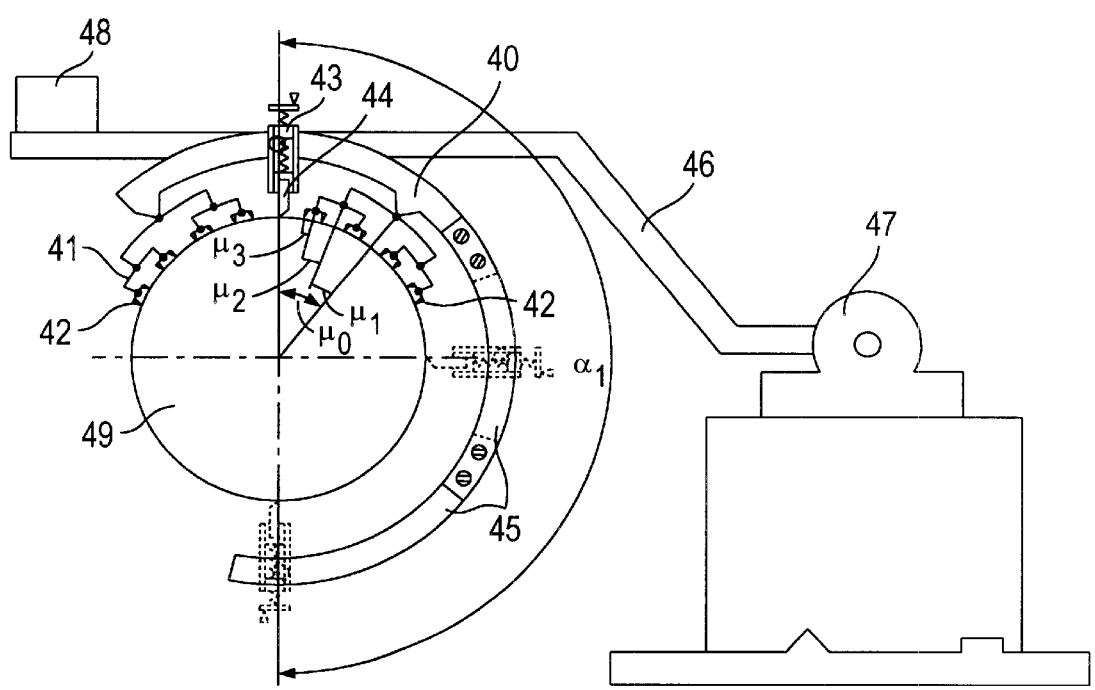
FIG. 9 shows the design of a correcting follower rest according to the present invention.
Figure 10:
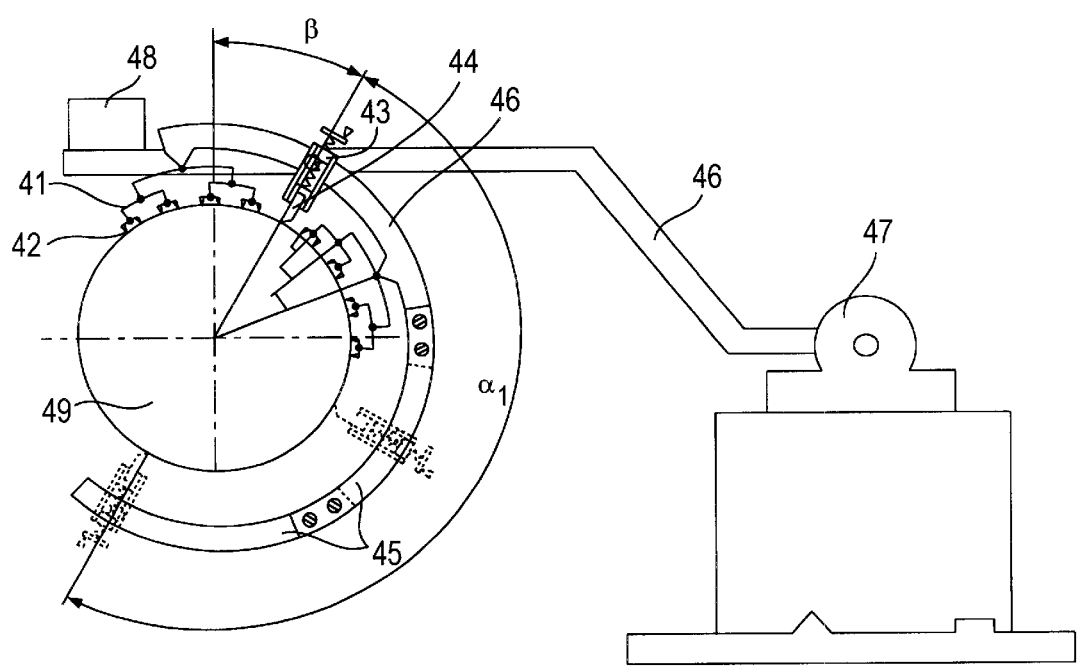
FIG. 10 shows the follower rest of FIG. 9, together with a cutting tool, displaced at an angle $\beta$.

A correcting follower rest having a three-stepped levers-and-hinges system is shown in FIGS. 9 and 10.

The correcting follower rest has a body including a yoke 40, which encircles the workpiece. In the yoke there are fitted inverted V-shaped self-adapting support elements capable of rocking movement with respect to the yoke. The support elements may alternatively be made as a pair of shoes or as a multi-stepped levers-and-hinges system, with each step containing a rocking lever. The shoes 42 are fitted on the ends of the last rocking lever 41.

Unit 43, bearing a cutting tool 44, which may be a lathe cutter or a grinder, is slideably mounted on the yoke 40. The position of unit 43 with cutting tool 44 along the yoke is determined by angle $\alpha_1$, which is between 0 and 180 degrees, as measured from the axis of symmetry of the support elements.

The feature of allowing selection of the cutting tool angle enables a high degree of precision in machining the parameters of the workpiece. Selection of the angle is determined by the workpiece type and on how the workpiece is set on the machine (e.g., in the chuck, in the centers, or in the steadying rests).

The yoke 40 may be made in multiple sections 45 that are joined together and which may be removed when necessary. The yoke with support elements and cutting tool is set on a lever arm 46 and is capable of rocking motion with respect to the lever arm 46. One end of the lever arm 46 is rotatably attached to a mount 47. The mount 47 is fixedly attached to a portion of the machine tool, such as the carriage of a lathe. A weight 48, for pressing the correcting follower rest to the surface of the workpiece 49 with sufficient force is attached to an opposite end of the lever arm 46. The workpiece may be positioned in the chuck, in the centers, or in the steadying rests, when the correcting follower rest is used.

The support elements and cutting tool are in parallel planes perpendicular to the axis of rotation of the workpiece. Depending on the workpiece type, shoes may be set alternatively either ahead of or following the cutting tool, as viewed from the direction of longitudinal feed. Generally support elements are positioned ahead of the cutting tool on an unmachined surface, however, in some cases this may prevent machining of the workpiece completely to its ends. For example, the shoes can be stopped by a flange. In such a case the tool and the support elements are interchanged in order to complete machining of the workpiece.

In such a situation, the device works as follows:

The support elements and the cutting tool are fitted in the yoke 40, which is hinged to the lever 46 and is capable of rocking in the plane perpendicular to the axis of rotation of the workpiece. The lever with yoke is attached to the mount, such that the lever is capable of rotation about the mount. The workpiece is advanced until it comes into contact with the cutting tool. A cutting depth is set, such as by rotating a flywheel on the device, and longitudinal feed of the workpiece is resumed. Support shoes are positioned ahead of the cutting tool, as viewed from the direction of feed, on an unfinished portion of the workpiece surface.

As the surface of the workpiece is machined, the self-adapting support elements cause stabilization of the cutting tool position with respect to the axis of rotation of the workpiece, due to the shoes being in contact with the workpiece surface at the selected angles $\mu_0$, $\mu_1$, $\mu_2$, $\mu_3$, as shown in FIG. 9.

The desired shape and roundness of the machined workpiece is generally attained either in a single cutting step or after only a few cutting steps.

For some types of workpieces, the yoke with the cutting tool needs to be set at an angle $\beta$, between from about −60 to about +60 degrees. This can be achieved alternatively by setting the yoke at the angle $\beta$ or by placing the cutting device on the workpiece and turning the yoke by cross feeding the carriage.

The follower rest is especially useful in performing final finishing machining steps on a workpiece surface.

Industrial Utility

The present invention enables a complex approach to determining the exact shape of a generally cylindrical object by comparing the shape of a workpiece against a reference shape according to a number of parameters using the device of the invention for measuring deviations in the shape of a object directly while the object is positioned in a machine such as a grinding or turning machine; enables machining and finishing of a workpiece blank to a desired generally cylindrical shape in the same machine without the necessity for removing the workpiece for measurement; and enables the machining of complex generally cylindrical shapes with unsymmetrical longitudinal axes by the use of steadying rests and/or correcting follower rests.

Tests conducted utilizing the apparatus of the present invention have demonstrated that improvements in the roundness of the workpiece by a factor of from 2 to 4 can be obtained in a single step cutting operation. By subsequent changing of the processing datum surface, it is possible to improve the roundness by the factor of 10 or more.

Prior measurement of the workpiece shape allows a determination of the best finishing conditions, such as support elements setting angles, cutting depth, and number of cuts), for an object, which greatly reduces machining time and chip volume.

Use of the embodiment of the device of the present invention for the measurement of shape deviations, having the correcting rests, enables problems previously encountered in the precision machining of large, heavy cylindrical workpieces to be successfully overcome.

The apparatus and method of the present invention are useful in measuring errors of form of nominally cylindrical or slightly conical workpieces, as well as for enabling the precision machining of cylindrical workpieces having a longitudinal axis that is unsymmetrical and thus unstable with respect to a machine tool in which the workpiece is processed.

What is claimed is:

1. A method of measuring shape deviations of a cylindrical workpiece and stabilizing a main longitudinal central axis of rotation of the workpiece in relation to a measuring sensor, the method comprising:

a.) performing a measurement of deviation from roundness of a cross-sectional profile of the workpiece using a first measuring sensor arranged on a roundness tester having multi-stepped, self-adapting support elements:

b.) measuring radial run-out of the workpiece's cross sectional profile from a center of an average least-squares circle fitted to the workpiece's cross-sectional profile using a second measuring sensor with a measuring tip that is in contact with a horizontal area on the roundness tester;

c.) moving the first and second sensors along a longitudinal axis of the workpiece, d.) measuring deviation from roundness and changes in the radius of average circles of a plurality of cross-sectional profiles, using the first sensor; and e.) measuring the run-out from average circle centers, using the second sensor, in order to enable a determination of the longitudinal cross-sectional shape of the workpiece and the deviation from straightness of its main central longitudinal axis to be made therefrom.

2. The method according to claim 1, further comprising measuring deviations from roundness and deviations from coaxiality of the workpiece, with relation to a reference profile, using a third measuring sensor with a measuring tip, the third measuring sensor being fitted on the body of the roundness tester, such that the measuring tip of the third measuring sensor is in contact with a surface of a rotating workpiece being measured.

3. A correcting steadying rest for holding and stabilizing a workpiece in a workpiece processing machine, the correcting steadying rest comprising:

a.) a plurality of correcting steadying rest bodies, each having a horizontal base portion and a vertical mount portion, such that each correcting steadying rest body is positioned perpendicularly to coaxial main central longitudinal axes of the workpiece and machine for imparting a predetermined shape to the workpiece, along a length thereof, with the vertical mount portion of each correcting steadying rest body having a hole extending therethrough for accommodating a correcting steadying rest axle;

b.) a plurality of correcting steadying rest axles, corresponding in number to the number of correcting steadying rest bodies, such that each correcting steadying rest body has a corresponding correcting steadying rest axle extending longitudinally horizontally through the hole in each vertical mount portion of each correcting steadying rest body, such that the correcting steadying rest axle is perpendicular to the correcting steadying rest body and is coaxial with the main central longitudinal axes of the workpiece and machine for imparting a predetermined shape to the workpiece;

c.) a plurality of yokes, corresponding in number to the number of correcting steadying rest bodies, such that a yoke is pivotally attached to a corresponding vertical portion of a correcting steadying rest body, about its corresponding correcting steadying rest axle, which passes through a hole in a central portion of each yoke, and further such that each correcting steadying rest axle and yoke is further capable of vertical sliding movement in the hole through the vertical mount portion of the correcting steadying rest body, within an angle measured between a line passing through the centers of rotation of the workpiece and the yoke and a horizontal line, with each yoke further having a pair of curved arms, with each curved arm having a proximal end and a distal end, such that the proximal end of each curved arm extends outward in an opposite direction from the central portion of each yoke, and the distal end of each curved arm is free, with the distal end of each curved arm further having a hole therethrough;

d.) a plurality of main shoe axles, corresponding in number to twice the number of correcting steadying rest bodies, such that a main shoe axle passes through the hole through the distal end of each curved arm; and e.) a plurality of main shoes, for holding and steadying the workpiece, corresponding in number to the number of main shoe axles, each main shoe having a central portion and a pair of arm portions with an arm portion extending outward from opposite sides of the central portion, the main shoe being formed as a block having an inverted V-shape, with each arm portion of the main shoe forming an arm of the V-shape and the central portion of the main shoe being at a juncture of the arms, and with there further being a hole extending through the central portion of each main shoe, such that a main shoe is pivotally attached to its corresponding main shoe axle at the hole through the central portion of the main shoe, and such that a surface of the main shoe on an inner part of its V-shape contacts the workpiece;

f.) a plurality of secondary support members, corresponding in number to the number of correcting steadying rest bodies, for supporting the workpiece and for pressing the workpiece against the main shoes, wherein each secondary support member includes:

g.) a secondary support element arm, having opposite first, proximal and second, distal ends, the secondary support element arm being axially slidable with respect to a base of the machine for imparting a predetermined shape to the workpiece, and the secondary support element arm having a vertically oriented hole therethrough proximate to the distal end thereof;

h.) a secondary support element axle, horizontally oriented and passing through the hole at the distal end of the secondary support element arm; and i.) a secondary support element shoe, each secondary support element shoe having a central portion and a pair of arm portions with an arm portion extending outward from opposite sides of the central portion, the secondary support element shoe being formed as a block having a V-shape, with each arm portion of the secondary support element shoe forming an arm of the V-shape and the central portion of the secondary support element shoe being at a juncture of the arms, and with there further being a hole extending through the central portion of each secondary support element shoe, such that a secondary support element shoe is pivotally attached to its corresponding secondary support element axle at the hole through the central portion of the secondary support element shoe, and such that a surface of the secondary support element shoe on an inner part of its V-shape contacts the workpiece.

4. A correcting follower rest, for holding and steadying a workpiece in a workpiece processing machine, the correcting follower rest comprising:
  a.) a correcting follower rest mount, having a base portion capable of being fixedly attached to the machine for imparting a predetermined shape to the workpiece, and having an upper portion with a vertically oriented hole therethrough;
  b.) a correcting follower axle, horizontally oriented and passing through the hole in the upper portion of the correcting follower rest mount;
  c.) a correcting follower rest lever arm, having a pair of opposite ends, with a first, proximal end being rotatingly attached to the correcting follower mount by the correcting follower axle, and a second, distal end being free, the correcting follower rest lever arm having at least one substantially vertically oriented portion and at least one substantially horizontally oriented portion between the ends;
  d.) a correcting follower rest weight attached to the second, distal end of the correcting follower rest lever arm, for pressing the correcting follower rest against a surface of the workpiece;
  e.) a yoke, attached to a substantially horizontally oriented portion of the correcting follower rest lever arm proximate to the distal end of the correcting follower rest lever arm, such that the yoke at least partially encircles the workpiece mounted on the machine, and further such that the yoke is capable of rotational movement with respect to the correcting follower rest lever arm and around the workpiece;
  f.) a shaping tool for shaping the workpiece to the predetermined shape, the shaping tool being movably attached to the yoke
  g.) at least one level of a plurality of secondary correcting follower rest support elements, each having a central portion and a pair of arm portions, with each arm portion having first, proximal and second, distal ends, with the proximal end of an arm portion of each of a pair of arm portions extending outwardly from opposite sides of each central portion, such that the arm portions are oriented substantially parallel to an outer surface of the workpiece, and with each distal end of each arm portion being free, and such that each of the first level of secondary correcting follower rest support elements is pivotally attached to the yoke by an axle extending through the central portion of each one of that level of secondary correcting follower rest support element, and any subsequent levels of secondary correcting follower rest support elements are attached to the previous level of secondary correcting follower rest support elements, such that there is a secondary correcting follower rest support element of a subsequent level pivotally attached by an axle, which extends through the central portion of that secondary correcting follower rest support element, to the distal end of each arm portion of each secondary correcting follower rest support element of the previous level, and
  h.) a plurality of secondary correcting follower rest shoes attached to the final level of secondary correcting follower rest support elements, such that there is a secondary correcting follower rest shoe pivotally attached to each distal end of each arm portion.

5. A method for measuring the deviations from cylindricity of a workpiece having a main central longitudinal axis and at least certain cylindrical properties, and for determining the exact shape of the workpiece, the method comprising:
  a.) providing a measuring device having a first measuring sensor to measure deviation from roundness of a cross sectional profile of the workpiece, at a plurality of locations along the main central longitudinal axis of the workpiece, by measuring the distance of points on the perimeter of a cross sectional profile of the workpiece at particular locations along the main central longitudinal axis of the workpiece, from corresponding points on the perimeter of an average, least-squares circle fitted to the actual profile of the workpiece at that location along the main central longitudinal axis of the workpiece;
  b.) providing a second measuring sensor on the device to measure radial displacement of the centers of fitted least squares average circle cross-sectional profiles of the workpiece at a plurality of locations along the main central longitudinal axis of the workpiece, by measuring changes in a diameter of the workpiece, at a plurality of locations along the main central longitudinal axis of the workpiece;
  c.) providing a third measuring sensor on the device to measure deviation from roundness of cross sectional profiles of the workpiece at locations along the main central longitudinal axis of the workpiece, with respect to a circular reference cross sectional profile; and to measure deviation from straightness of the main central longitudinal axis of the workpiece itself, with respect to a straight reference axis; and
  d.) utilizing measurements taken by the first, second, and third sensors to determine an overall exact shape of the workpiece.

6. A correcting steadying rest for holding and stabilizing a workpiece in a machine tool, the steadying rest comprising a body with a plurality of self-adapting inverted V-shaped support elements which contact the workpiece and at least one auxiliary support element to compensate for the weight of the workpiece, the correcting steadying rest further having a slider with a yoke attached to the body of the correcting steadying rest, with the yoke being capable of both rocking movement and vertical movement, and the yoke having main support elements that are hingedly attached to opposite ends of the yoke, and auxiliary support elements, which also have an inverted V-shape, and are mounted on the slider, the slider being positioned at an angle with a vertical reference line and the slider being capable of linear movement within the body of the steadying rest.

7. The correcting steadying rest according to claim 6, wherein the main support elements are attached to the yoke such that an angle between radii passing through a center of rotation of the workpiece and an axis of the main support elements is from about 50 to about 130 degrees.

8. The correcting steadying rest according to claim 6, wherein each inverted V-shaped main support element is positioned such that an angle between radii passing through a center of rotation of the workpiece, an axis of the main support elements, and a point of contact of an edge of an inverted V-shaped block of the main support elements with the workpiece is from about 10 to about 40 degrees.

9. The correcting steadying rest according to claim 6, wherein the slider is positioned at an angle of from about 5 to about 20 degrees between a vertical reference line and a radius passing through a center of rotation of the workpiece and an axis of the auxiliary support elements.

10. The correcting steadying rest according to claim 6, wherein the yoke has equal length arms that are capable of moving along the body of the yoke.

11. A correcting follower rest for holding and stabilizing a workpiece in a machine tool, the correcting follower rest comprising a body with self-adapting inverted V-shaped support elements, the follower rest being capable of rocking movement in a plane perpendicular to an axis of rotation of the workpiece, and such that the body is made as a workpiece-encircling yoke mounted on a lever capable of rotation on a mount, which is fixed on a carriage of the machine tool, and further such that the machine tool is capable of movement along the yoke at an angle of from about 0 to about 180 degrees with respect to an axis of symmetry of the support elements.

12. The correcting follower rest according to claim 11, wherein the yoke is capable of movement at an angle of from about ±60 degrees with respect to an axis of rotation of the workpiece.

13. The correcting follower rest according to claim 11, wherein the support elements and the cutting tool are in parallel planes that are perpendicular to an axis of rotation of the workpiece.

14. The correcting follower rest according to claim 11, wherein the inverted V-shaped support elements are made alternatively in a single-step or a multi-step configuration, with each element including a rocking yoke having a shoe hingedly attached at each end of the rocking yoke.

15. The correcting follower rest according to claim 11, for use with a machine tool that is a cutting tool or an abrasive grinder.

16. A device for measuring deviations in shape of a workpiece having at least certain cylindrical properties, the deviations being measured with respect to at least one reference standard, and measurements capable of being made while the workpiece is positioned in a machine for imparting a predetermined shape to the workpiece starting from a workpiece blank, without necessitating removal of the workpiece from the machine in order to take the measurements, the device comprising:

a.) a vertical mount, having a top and a base, such that the vertical mount is capable of slidable movement substantially coaxial with a main central longitudinal axis of the workpiece that is substantially perpendicular to the vertical mount;

b.) a horizontal lever arm, having a pair of first and second opposite ends, and pivotally attached to the vertical mount at a point that is proximal to the top of the vertical mount and is along the lever arm between its opposite ends;

c.) a main body of the device, having a pair of arms formed in an inverted V-shape, with each arm of the pair having a pair of oppositely disposed ends, with the arms being disposed in angularly vertically downward directions, such that first ends of each of the two arms are angularly joined together to form the V-shape and the second end of each arm is free, the main body of the device further having at least one horizontal surface, and the main body of the device being attached to the first end of the horizontal lever arm;

d.) a pair of first-step sliding levers, each first-step sliding lever having an upper portion and a lower portion, and first and second opposite ends, such that a first-step sliding lever is slideably attached at the upper portion thereof to the free end of each arm of the main body of the device;

e.) a pair of first-step axles and corresponding first-step rocking levers, such that there is a first-step axle and a corresponding first-step rocking lever associated with each first-step sliding lever, each first-step rocking lever having a first and second opposite ends, with a first-step rocking lever being pivotally attached to the lower portion of each first-step sliding lever by a corresponding one of the first-step axles;

f.) a plurality of second-step sliding levers, each second-step sliding lever having an upper portion and a lower portion, and first and second opposite ends, such that a second-step sliding lever is slideably attached at the upper portion thereof to each of the first and second opposite ends of each of the first-step rocking levers;

g.) a plurality of second-step axles and corresponding second-step rocking levers, such that there is a pair of second-step axles and corresponding second-step rocking levers associated with each second-step sliding lever, with a second-step rocking lever having first and second opposite ends, and with a second-step rocking lever being pivotally attached to the lower portion of each second-step sliding lever by a corresponding one of the second-step axles, such that the second-step rocking levers are capable of contacting the surface of the workpiece;

h.) a first, main measuring sensor vertically attached at a juncture of the two arms of the main body, and having a first measuring tip at a lower end of the sensor that is capable of contacting a surface of the workpiece being measured;

i.) a counterweight attached to the second end of the horizontal lever arm;

j.) a horizontal fixed arm, having a pair of opposite first and second ends, the horizontal fixed arm being attached at a first end to the top of the vertical mount; and k.) a second measuring sensor, attached to the second end of the horizontal fixed arm, with the second measuring sensor being positioned vertically and perpendicular to the horizontal fixed arm, the second measuring sensor having a second measuring tip at a lower end thereof that is capable of contacting the horizontal surface of the main body of the device.

17. The device according to claim 16, further comprising:

l.) an L-shaped bracket, having a horizontal arm portion and a vertical arm portion, the L-shaped bracket being attached to the main body of the device at a free end of the horizontal arm portion, the L-shaped bracket being aligned coaxially with a main longitudinal axis of the workpiece, and the L-shaped bracket having a free end at an opposite end of the vertical arm portion;

m.) a third measuring sensor, vertically mounted on the free end of the L-shaped bracket at the end of the vertical arm portion of the L-shaped bracket, such that the third measuring sensor is capable of contacting a surface of the workpiece.

18. The device according to claim 16, further comprising a signal processing unit for receiving information from the first and second measuring sensors.

19. The device according to claim 16, further comprising a signal processing unit for receiving information from the first, second, and third measuring sensors.

20. The device according to claim 16, further comprising a correcting steadying rest on which a workpiece being measured with the device is placed.

21. The device according to claim 20, wherein the correcting steadying rest comprises:

a.) a plurality of correcting steadying rest bodies, each having a horizontal base portion and a vertical mount portion, such that each correcting steadying rest body is positioned perpendicularly to coaxial main central longitudinal axes of the workpiece and machine for imparting a predetermined shape to the workpiece, along a length thereof, with the vertical mount portion of each correcting steadying rest body having a hole extending therethrough for accommodating a correcting steadying rest axle;

b.) a plurality of correcting steadying rest axles, corresponding in number to the number of correcting steadying rest bodies, such that each correcting steadying rest body has a corresponding correcting steadying rest axle extending longitudinally horizontally through the hole in each vertical mount portion of each correcting steadying rest body, such that the correcting steadying rest axle is perpendicular to the correcting steadying rest body and is coaxial with the main central longitudinal axes of the workpiece and machine for imparting a predetermined shape to the workpiece;

c.) a plurality of yokes, corresponding in number to the number of correcting steadying rest bodies, such that a yoke is pivotally attached to a corresponding vertical portion of a correcting steadying rest body, about its corresponding correcting steadying rest axle, which passes through a hole in a central portion of each yoke, and further such that each correcting steadying rest axle and yoke is further capable of vertical sliding movement in the hole through the vertical mount portion of the correcting steadying rest body, within an angle measured between a line passing through the centers of rotation of the workpiece and the yoke and a horizontal line, with each yoke further having a pair of curved arms, with each curved arm having a proximal end and a distal end, such that the proximal end of each curved arm extends outward in an opposite direction from the central portion of each yoke, and the distal end of each curved arm is free, with the distal end of each curved arm further having a hole therethrough;

d.) a plurality of main shoe axles, corresponding in number to twice the number of correcting steadying rest bodies, such that a main shoe axle passes through the hole through the distal end of each curved arm; and e.) a plurality of main shoes, for holding and steadying the workpiece, corresponding in number to the number of main shoe axles, each main shoe having a central portion and a pair of arm portions with an arm portion extending outward from opposite sides of the central portion, the main shoe being formed as a block having an inverted Vshape, with each arm portion of the main shoe forming an arm of the V-shape and the central portion of the main shoe being at a juncture of the arms, and with there further being a hole extending through the central portion of each main shoe, such that a main shoe is pivotally attached to its corresponding main shoe axle at the hole through the central portion of the main shoe, and such that a surface of the main shoe on an inner part of its V-shape contacts the workpiece;

f.) a plurality of secondary support members, corresponding in number to the number of correcting steadying rest bodies, for supporting the workpiece and for pressing the workpiece against the main shoes.

22. The device according to claim 21, wherein the secondary support member is movably attached to a base of a machine for imparting a predetermined shape to the workpiece.

23. The device according to claim 21, wherein a secondary support member comprises:

g.) a secondary support element arm, having opposite first, proximal and second, distal ends, the secondary support element arm being axially slidable with respect to a base of the machine for imparting a predetermined shape to the workpiece, and the secondary support element arm having a vertically oriented hole therethrough proximate to the distal end thereof;

h.) a secondary support element axle, horizontally oriented and passing through the hole at the distal end of the secondary support element arm; and i.) a secondary support element shoe, each secondary support element shoe having a central portion and a pair of arm portions with an arm portion extending outward from opposite sides of the central portion, the secondary support element shoe being formed as a block having a V-shape, with each arm portion of the secondary support element shoe forming an arm of the V-shape and the central portion of the secondary support element shoe being at a juncture of the arms, and with there further being a hole extending through the central portion of each secondary support element shoe, such that a secondary support element shoe is pivotally attached to its corresponding secondary support element axle at the hole through the central portion of the secondary support element shoe, and such that a surface of the secondary support element shoe on an inner part of its V-shape contacts the workpiece.

24. The device according to claim 23, wherein the secondary support element arm forms an angle of from about 5 degrees to about 20 degrees, as measured between a vertical reference line and a radius passing through a center of rotation of the workpiece and the central portion of the secondary support element shoe.

25. The device according to claim 23, wherein the secondary support member is made movable with respect to the base by use of a movable wedge and adjusting thumbscrew for loosening and tightening the wedge.

26. The device according to claim 21, wherein there are at least two correcting steadying rest bodies.

27. The device according to claim 21, wherein the correcting steadying rest bodies are attached to a base of the machine for imparting a predetermined shape to the workpiece.

28. The device according to claim 27, wherein the correcting steadying rest bodies are attached to the base of the machine for imparting a predetermined shape to the workpiece such that they are longitudinally axially slidable with respect to the base of the machine.

29. The device according to claim 16, further comprising a correcting follower rest on which a workpiece being measured with the device is placed.

30. The device according to claim 29, wherein the correcting follower rest comprises:

a.) a correcting follower rest mount, having a base portion capable of being fixedly attached to the machine for imparting a predetermined shape to the workpiece, and having an upper portion with a vertically oriented hole therethrough;

b.) a correcting follower axle, horizontally oriented and passing through the hole in the upper portion of the correcting follower rest mount;

c.) a correcting follower rest lever arm, having a pair of opposite ends, with a first, proximal end being rotatingly attached to the correcting follower mount by the correcting follower axle, and a second, distal end being free, the correcting follower rest lever arm having at least one substantially vertically oriented portion and at least one substantially horizontally oriented portion between the ends;

d.) a correcting follower rest weight attached to the second, distal end of the correcting follower rest lever arm, for pressing the correcting follower rest against a surface of the workpiece;

e.) a yoke, attached to a substantially horizontally oriented portion of the correcting follower rest lever arm proximate to the distal end of the correcting follower rest lever arm, such that the yoke at least partially encircles the workpiece mounted on the machine, and further such that the yoke is capable of rotational movement with respect to the correcting follower rest lever arm and around the workpiece;

f.) a shaping tool for shaping the workpiece to the predetermined shape, the shaping tool being movably attached to the yoke g.) at least one level of a plurality of secondary correcting follower rest support elements, each having a central portion and a pair of arm portions, with each arm portion having first, proximal and second, distal ends, with the proximal end of an arm portion of each of a pair of arm portions extending outwardly from opposite sides of each central portion, such that the arm portions are oriented substantially parallel to an outer surface of the workpiece, and with each distal end of each arm portion being free, and such that each of the first level of secondary correcting follower rest support elements is pivotally attached to the yoke by an axle extending through the central portion of each one of that level of secondary correcting follower rest support element, and any subsequent levels of secondary correcting follower rest support elements are attached to the previous level of secondary correcting follower rest support elements, such that there is a secondary correcting follower rest support element of a subsequent level pivotally attached by an axle, which extends through the central portion of that secondary correcting follower rest support element, to the distal end of each arm portion of each secondary correcting follower rest support element of the previous level, and h.) a plurality of secondary correcting follower rest shoes attached to the final level of secondary correcting follower rest support elements, such that there is a secondary correcting follower rest shoe pivotally attached to each distal end of each arm portion.

31. The device according to claim 30, wherein are from one (1) to three (3) levels of secondary correcting follower rest support element s.

32. The device according to claim 31, wherein there are three (3) levels of secondary correcting follower rest support elements.

33. The device according to claim 23, further comprising a correcting follower rest including:

j.) a correcting follower rest mount, having a base portion capable of being fixedly attached to the machine for imparting a predetermined shape to the workpiece, and having an upper portion with a vertically oriented hole therethrough;

k.) a correcting follower axle, horizontally oriented and passing through the hole in the upper portion of the correcting follower rest mount;

l.) a correcting follower rest lever arm, having a pair of opposite ends, with a first, proximal end being rotatingly attached to the correcting follower mount by the correcting follower axle, and a second, distal end being free, the correcting follower rest lever arm having at least one substantially vertically oriented portion and at least one substantially horizontally oriented portion between the ends;

m.) a correcting follower rest weight attached to the second, distal end of the correcting follower rest lever arm, for pressing the correcting follower rest against a surface of the workpiece;

n.) a yoke, attached to a substantially horizontally oriented portion of the correcting follower rest lever arm proximate to the distal end of the correcting follower rest lever arm, such that the yoke at least partially encircles the workpiece mounted on the machine, and further such that the yoke is capable of rotational movement with respect to the correcting follower rest lever arm and around the workpiece;

o.) a shaping tool for shaping the workpiece to the predetermined shape, the shaping tool being movably attached to the yoke p.) at least one level of a plurality of secondary correcting follower rest support elements, each having a central portion and a pair of arm portions, with each arm portion having first, proximal and second, distal ends, with the proximal end of an arm portion of each of a pair of arm portions extending outwardly from opposite sides of each central portion, such that the arm portions are oriented substantially parallel to an outer surface of the workpiece, and with each distal end of each arm portion being free, and such that each of the first level of secondary correcting follower rest support elements is pivotally attached to the yoke by an axle extending through the central portion of each one of that level of secondary correcting follower rest support element, and any subsequent levels of secondary correcting follower rest support elements are attached to the previous level of secondary correcting follower rest support elements, such that there is a secondary correcting follower rest support element of a subsequent level pivotally attached by an axle, which extends through the central portion of that secondary correcting follower rest support element, to the distal end of each arm portion of each secondary correcting follower rest support element of the previous level, and q.) a plurality of secondary correcting follower rest shoes attached to the final level of secondary correcting follower rest support elements, each secondary correcting follower rest shoe having a central portion and a pair of arm portions with an arm portion extending outward from opposite sides of the central portion, such that there is a secondary correcting follower rest shoe pivotally attached to the distal end of each arm portion of each secondary correcting follower rest support element, each secondary correcting follower rest shoe being formed as a block having an inverted V-shape, with each arm portion of the correcting follower rest shoe forming an arm of the V-shape and the central portion of the correcting follower rest shoe being at a juncture of the arms, and with there further being a hole extending through the central portion of each correcting follower rest shoe, such that a correcting follower rest shoe is pivotally attached to the distal end of each arm portion of each final level of correcting follower rest support elements, and such that a surface of the correcting follower rest shoe on an inner part of its V-shape contacts the workpiece.

34. A device for measuring shape deviations of a workpiece having at least certain cylindrical properties, the device comprising a roundness tester arranged on a mount, and fitted with multi-stepped, self-adapting support elements, and having a first measuring sensor with a tip, the first measuring sensor being mounted on a body of the roundness tester; and further having a measuring unit, with the measuring unit including an arm, having an opposing pair of ends, with one end attached to the roundness tester mount, and a second measuring sensor attached to the opposite, free end, such that a tip of the second measuring sensor is in contact with a horizontal area on the roundness tester body, and further such that the mount is capable of axial movement along a longitudinal axis of the workpiece.

35. The device according to claim 34, further comprising a removable arm having an opposing pair of ends, with one end being fixed to the roundness tester mount, and having a flat area at the opposite end, which is in contact with the tip of the first measuring sensor.

36. The device according to claim 34, further comprising a third measuring sensor with a tip, the third measuring sensor being attached to a removable bracket mounted on the roundness tester body, the third measuring sensor being capable of contacting with a surface of the workpiece.

37. The device according to claim 35, further comprising a third measuring sensor with a tip, the third measuring sensor being attached to a removable bracket mounted on the roundness tester body, the third measuring sensor being capable of contacting with a surface of the workpiece.

* * * * *